(12) United States Patent
Yasukochi et al.

(10) Patent No.: US 11,548,241 B2
(45) Date of Patent: Jan. 10, 2023

(54) FIBER WIDTH ADJUSTMENT DEVICE, FIBER WIDTH ADJUSTMENT METHOD AND COMPOSITE MATERIAL MOLDING METHOD

(71) Applicants: SUBARU CORPORATION, Tokyo (JP); Fukui Prefectural Government, Fukui (JP)

(72) Inventors: Natsumi Yasukochi, Tokyo (JP); Kei Koiwai, Tokyo (JP); Shigekazu Uchiyama, Tokyo (JP); Kazumasa Kawabe, Fukui (JP); Keiichi Kondo, Fukui (JP); Hirofumi Iyo, Fukui (JP)

(73) Assignees: SUBARU CORPORATION, Tokyo (JP); FUKUI PREFECTURAL GOVERNMENT, Fukui (JP)

(*) Notice: Subject to any disclaimer, the term of this patent is extended or adjusted under 35 U.S.C. 154(b) by 425 days.

(21) Appl. No.: 16/600,204

(22) Filed: Oct. 11, 2019

(65) Prior Publication Data
US 2020/0190700 A1 Jun. 18, 2020

(30) Foreign Application Priority Data
Dec. 12, 2018 (JP) .............................. JP2018-232697

(51) Int. Cl.
*B29C 70/38* (2006.01)
*B29B 15/12* (2006.01)
(Continued)

(52) U.S. Cl.
CPC .......... *B29C 70/388* (2013.01); *B29B 15/122* (2013.01); *B29C 70/54* (2013.01); *B29C 70/545* (2013.01); *D01D 11/02* (2013.01)

(58) Field of Classification Search
CPC ....... D01D 11/02; B29B 15/122; B29C 70/38; B29C 70/382; B29C 70/384; B29C 70/386; B29C 70/388; B29C 70/545
See application file for complete search history.

(56) References Cited

U.S. PATENT DOCUMENTS 3,592,371 A * 7/1971 Wyatt .................. B65H 23/035
28/282
5,698,066 A * 12/1997 Johnson .............. B29C 53/8016
156/499
(Continued)

FOREIGN PATENT DOCUMENTS

JP 2004-027078 A 1/2004
JP 2004-218133 A 8/2004
(Continued)

OTHER PUBLICATIONS

European Office Action, dated Apr. 19, 2021, in European Application No. 19 208 479.6-1017.
(Continued)

*Primary Examiner* — George R Koch
(74) *Attorney, Agent, or Firm* — McGinn I.P. Law Group, PLLC.

(57) ABSTRACT

According to one implementation, a fiber width adjustment device includes: a feeder and an adjuster. The feeder feeds a tape material in a length direction of the tape material. The tape material consists of fibers for a fiber reinforced resin after or before the fibers are impregnated with a resin. The adjuster has a path for the tape material. The path is formed by at least a bottom and a pair of wall surfaces. The interval of the wall surfaces decreased gradually. The width of the tape material which passed the path is changed by adjusting a part of the path. The tape material passes through the part of the path while contacting with the bottom and the wall surfaces.

15 Claims, 9 Drawing Sheets

(51) Int. Cl.
    *D01D 11/02*     (2006.01)
    *B29C 70/54*     (2006.01)

(56) References Cited

U.S. PATENT DOCUMENTS 9,003,619 B2     4/2015   Kawabe
2018/0361685 A1*  12/2018  Fujita ..................... B29C 70/06

FOREIGN PATENT DOCUMENTS

| | | |
|---|---|---|
| JP | 2009-234065 A | 10/2009 |
| JP | 2010-150685 A | 7/2010 |
| JP | 2015-063049 A | 4/2015 |
| WO | WO 2010/137525 A1 | 12/2010 |
| WO | WO 2011/116191 A1 | 9/2011 |
| WO | WO-2017090551 A1 * | 6/2017 ............. B29C 70/06 |

OTHER PUBLICATIONS

Extended European Search Report dated Apr. 29, 2020 for European Patent Application No. 19208479.6-1017.
Japanese Office Action, dated Apr. 27, 2022, in Japanese Application No. 2018-232697 and English Translation thereof.

* cited by examiner

FIBER WIDTH ADJUSTMENT DEVICE, FIBER WIDTH ADJUSTMENT METHOD AND COMPOSITE MATERIAL MOLDING METHOD

CROSS REFERENCES TO RELATED APPLICATIONS

This application is based upon and claims the benefit of priority from Japanese Patent Application No. 2018-232697, filed on Dec. 12, 2018; the entire contents of which are incorporated herein by reference.

FIELD

Implementations described herein relate generally to a fiber width adjustment device, a fiber width adjustment method and a composite material molding method.

BACKGROUND

Conventionally, a fiber reinforced plastic (FRP), such as a glass fiber reinforced plastic (GFRP) and a carbon fiber reinforced plastic (CFRP) is known as a material consisting of a resin reinforced with fibers. The FRP, which is also called composite material, is produced by impregnating fibers with a thermosetting resin and subsequent thermal curing of the resin.

More specifically, a composite material can be produced by laminating and shaping sheets of prepreg, which is sheet like material consisting of fibers impregnated with an uncured thermosetting resin, and subsequent thermal curing of the shaped laminated body of the prepreg. Alternatively, a method in which fiber sheets which has not been impregnated with a thermosetting resin are laminated and shaped, and subsequently, the fiber sheets are impregnated with a thermosetting resin and the resin is thermally cured is also known as an RTM (resin transfer molding) method (for example, refer to Japanese Patent Application Publication JP 2004-218133 A, Japanese Patent Application Publication JP 2009-234065 A and Japanese Patent Application Publication JP 2010-150685 A). Out of RTM methods, a method in which fibers are impregnated with a resin by vacuuming is called a VaRTM (vacuum assisted resin transfer molding) method while a method in which fibers are impregnated with a resin by molds is called a matched-die RTM method.

When a composite material is produced by an RTM method, it is required to produce sheet like fibers having appropriate width and thickness as a material. Accordingly, a technique of opening a reinforcing fiber bundle, such as a carbon fiber bundle or a glass fiber bundle, thinly and uniformly is known (for example, refer to international publication WO 2010-137525 A).

Opening a fiber bundle is work for thinning the fiber bundle obtained by bundling about 12,000 to 24,000 fibers, each having a thickness of about 0.007 mm, while spreading width continuously using a roller and the like. In recent years, a fiber tape obtained by opening a fiber bundle has been sold under the name of a dry tape material.

Moreover, a dry tape material, to which a sheet like or powdery thermoplastic binder has been attached, has been also sold. Therefore, dry tape materials can be laminated while being temporarily fixed by heat-sealing a thermoplastic binder.

An object of the present invention is to allow easily adjusting width of a fiber sheet, before or after impregnation with a resin, for a fiber reinforced resin composite material.

SUMMARY OF THE INVENTION

In general, according to one implementation, a fiber width adjustment device includes a feeder and an adjuster. The feeder feeds a tape material in a length direction of the tape material. The tape material consists of fibers for a fiber reinforced resin after or before the fibers are impregnated with a resin. The adjuster has a path for the tape material. The path is formed by at least a bottom and a pair of wall surfaces. An interval of the wall surfaces decreased gradually. The width of the tape material which passed the path is changed by adjusting a part of the path. The tape material passes through the part of the path while contacting with the bottom and the wall surfaces.

Further, according to one implementation, a method of adjusting the width of the fibers includes producing the tape material, having the adjusted width, using the above-mentioned fiber width adjustment device.

Further, according to one implementation, a method of adjusting a width of fibers includes: feeding a tape material in a length direction of the tape material; and changing a width of the tape material which passed a path for the tape material. The tape material consists of fibers for a fiber reinforced resin after or before the fibers are impregnated with a resin. The path is formed by at least a bottom and a pair of wall surfaces. An interval of the wall surfaces decreases gradually. The width is changed by adjusting a part of the path. The tape material passes through the part of the path while contacting with the bottom and the wall surfaces.

Further, according to one implementation, a method of molding a composite material includes: producing a laminated body of the fibers by laminating the tape material of which the width has been adjusted by the above-mentioned fiber width adjustment device; and producing the composite material by thermal curing of the resin with which the laminated body of the fibers has been impregnated.

Further, according to one implementation, a method of molding a composite material includes: producing a laminated body of the fibers by laminating the tape material of which the width has been adjusted by the above-mentioned method of adjusting the width of the fibers; and producing the composite material by thermal curing of the resin with which the laminated body of the fibers has been impregnated.

BRIEF DESCRIPTION OF THE DRAWINGS

In the accompanying drawings:

FIG. 3 is an enlarged perspective view of the width adjuster shown in

FIG. 1;

FIG. 5 is an enlarged perspective view of the width adjuster shown in

FIG. 4;

DETAILED DESCRIPTION

A fiber width adjustment device, a fiber width adjustment method and a composite material molding method according to implementations of the present invention will be described with reference to the accompanying drawings.

First Implementation (Structure and Function of Fiber Width Adjustment Device)

Figure 1:
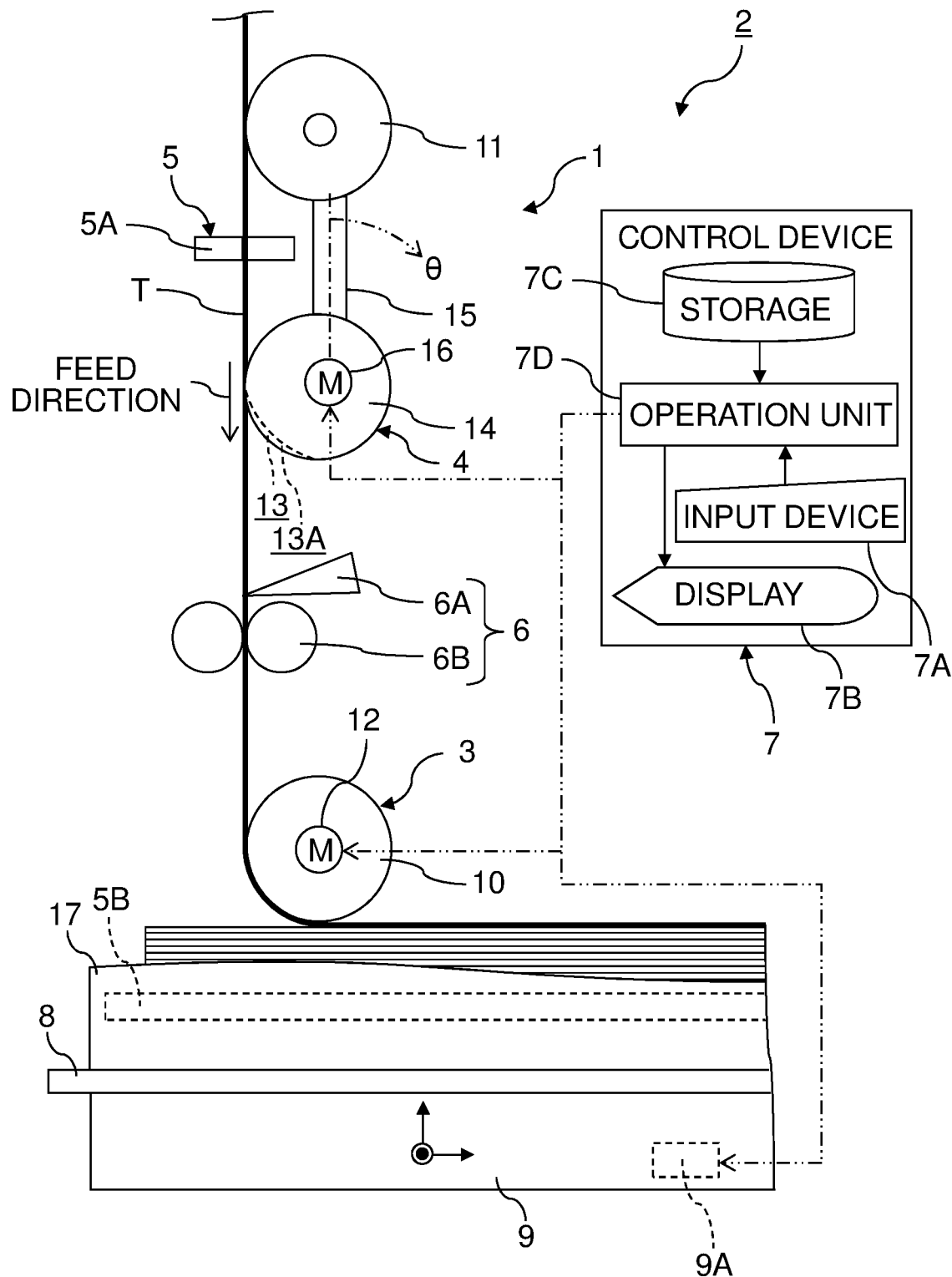
FIG. 1 is a front view showing structures of a fiber width adjustment device 1 according to the first implementation of the present invention and an automatic lamination apparatus having the fiber width adjustment device.

FIG. 1 is a front view showing structures of a fiber width adjustment device 1 according to the first implementation of the present invention and an automatic lamination apparatus 2 having the fiber width adjustment device 1.

The width adjustment device 1 adjusts the width of a tape material T consisting of fibers for FRP which have been impregnated with a resin or have not been impregnated with a resin. Fiber bundle tape which has not been impregnated with a resin is called a dry tape material. A dry tape material is produced by a known method of opening a fiber bundle. Meanwhile, a fiber sheet for FRP which has been impregnated with a resin is called prepreg. A dry tape material and prepreg are each used as a material of FRP composite material, such as CFRP and GFRP.

The typical marketed tape material T, such as a dry tape material or a prepreg tape, has a thickness of about 240 μm. In particular, using thin layer tape material, having a thickness of not less than 20 μm and not more than 120 μm, as the tape material T makes it possible to easily deform the tape material T. Therefore, the width of the tape material T can also be easily adjusted by the width adjustment device 1. As a matter of course, the width of the tape material T thicker than 120 μm may be material and adjusted by the width adjustment device 1.

A dry tape material has been sold in a state that thermoplastic binder, such as a binder sheet, a binder net, nonwoven fabric binder or powdery binder, has been attached, powdery or liquid thermosetting binder has been attached, or no binder has been attached. Any type of dry tape material may be used.

When a composite material is produced using dry tape materials, the composite material is produced by an RTM method. Specifically, dry tape materials are laminated on a shaping mold to be shaped into a shape of the composite material. Subsequently, the shaped dry tape materials are impregnated with a resin. After that, the resin is thermally cured. Thereby, the composite material can be produced. When binder is included in the dry tape materials, the binder may be heated before shaping. Fibers shaped into a shape of a composite material are called a dry preform. Common molds or different molds may be used as shaping molds for shaping a dry preform and molds for thermal curing of a composite material.

Meanwhile, when a composite material is produced using prepreg, sheets of the prepreg are laminated on a mold to be shaped into a shape of the composite material. Subsequently, a laminated body of the prepreg is thermally cured. Thereby, the composite material can be produced. A laminated body of prepreg shaped into a shape of a composite material is called a preform. Note that, a dry preform is also a kind of preform in a broad sense.

Therefore, the tape materials T consisting of a dry tape material or a prepregs tape of which width has been adjusted by the width adjustment device 1 are laminated for producing a composite material. Thus, the width adjustment device 1 for the tape material T can be included in the automatic lamination apparatus 2 for the tape material T as exemplified in FIG. 1. In other words, the width adjustment device 1 of the tape material T can be provided with a function to laminate the tape material T.

The width adjustment device 1 can be composed of a feeder 3, a width adjuster 4, at least one heater 5, a cutter 6 and a control device 7. When the width adjustment device 1 is provided with a function as the automatic lamination apparatus 2 which automatically laminates the tape material T, the automatic lamination apparatus 2 can be composed of a table 8 and a moving structure 9.

Figure 2:
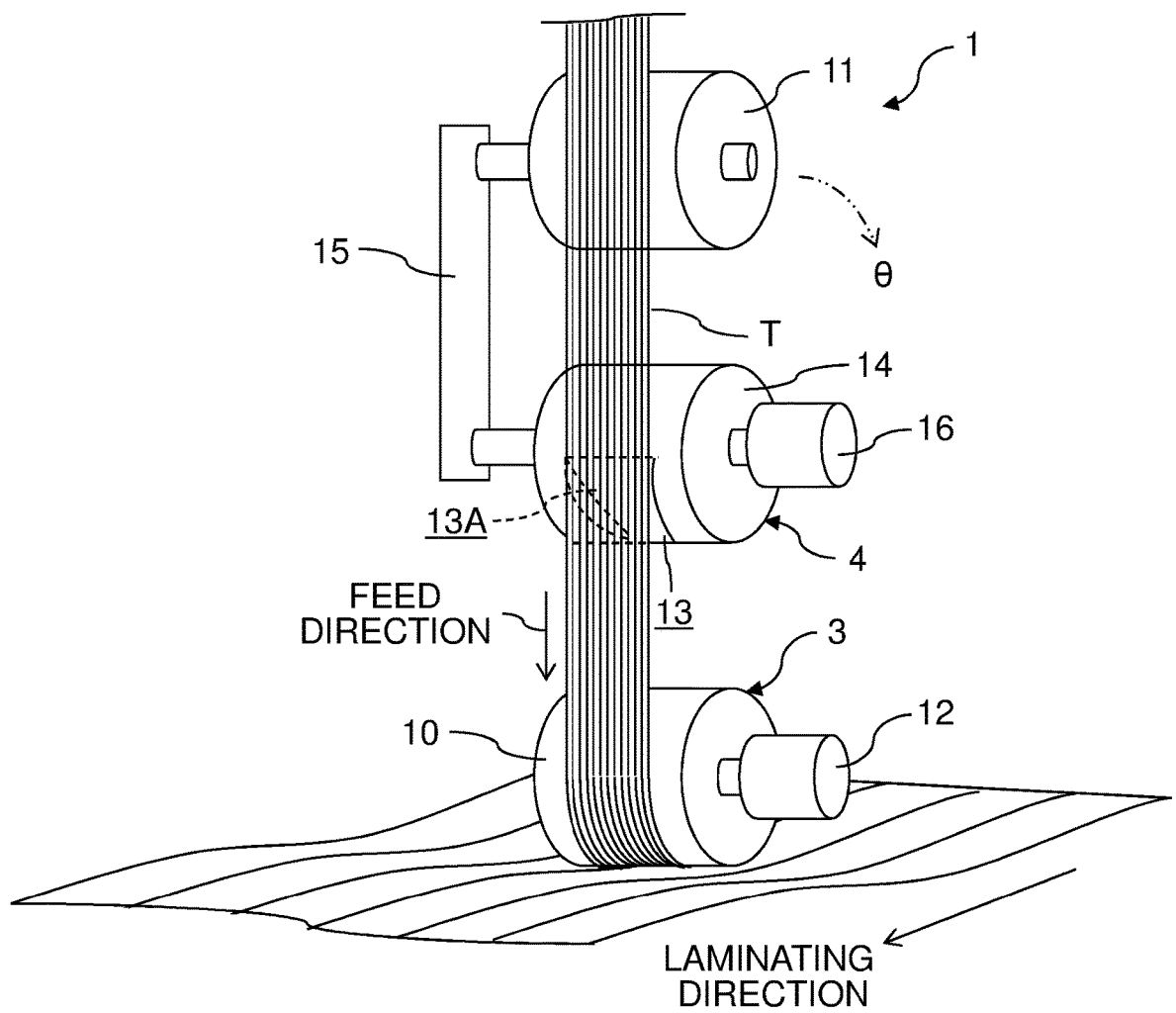
FIG. 2 is a perspective view of the feeder and the width adjuster included in the width adjustment device 1 shown in FIG. 1.

FIG. 2 is a perspective view of the feeder 3 and the width adjuster 4 included in the width adjustment device 1 shown in FIG. 1.

The feeder 3 feeds the tape material T in the length direction of the tape material T. Therefore, the feeder 3 has at least one roller. In an example shown in FIG. 1 and FIG. 2, the feeder 3 for feeding the tape material T, supplied from a stock roller, around which the tape material T has been wound, and the like, in the length direction of the tape material T, is composed of a compaction roller 10 and a fiber bundle support roller 11. Specifically, the tape material T can be fed in the length direction of the tape material T while the tension of the tape material T is maintained by the frictional force between the tape material T and each of the cylindrical or columnar compaction roller 10 and fiber bundle support roller 11 which have been disposed at different positions from each other in the length direction of the tape material T, in addition to the rotations of the compaction roller 10 and the fiber bundle support roller 11.

The compaction roller 10 disposed in the feeding side of the tape material T can be automatically rotated by the power of a motor 12. In that case, the rotating shaft of the compaction roller 10 is directly coupled with the output shaft of the motor 12, or indirectly coupled to the output shaft of the motor 12 through a gear, a power transmission belt or the like. Alternatively, when the width adjustment device 1 is manually operated by a worker, a handle may be attached to the rotating shaft of the compaction roller 10 so that a worker can operate the handle to rotate the compaction roller 10 manually.

As described below, the tape material T may be held between the other laminated tape materials T and the compaction roller 10 so that the compaction roller 10 may be rotated only by the frictional force between the compaction roller 10 and the tape material T. Also in that case, a power device, such as the motor 12, for automatically rotating the compaction roller 10, can be omitted.

Meanwhile, the fiber bundle support roller 11, disposed in the feeding origin side of the tape material T in order to maintain the tension of the tape material T, can be rotated by the frictional force between the tape material T and the fiber bundle support roller 11. Alternatively, in order to prevent the tape material T from loosening, the rotating shaft of the fiber bundle support roller 11 may be rotated by a motor of which rotating torque of the output shaft has been adjusted so that a rotating torque not more than a rotating torque applied on the rotating shaft of the compaction roller 10 may be applied on the rotating shaft of the fiber bundle support roller 11.

The width adjuster 4 changes the width of the tape material T fed by the feeder 3. The width adjuster 4 has a path 13 for the tape material T formed by at least a bottom and a pair of wall surfaces of which interval decreases gradually. Therefore, the width of the tape material T which passed through the path 13 can be changed by adjusting a part of the path 13 through which the tape material T passes in the state that the tape material T is in contact with the bottom and the wall surfaces.

Specifically, when the tape material T is led into the path 13 of which width decreases gradually, pressures in the width direction of the tape material T are applied on the tape material T from the wall surfaces in both sides in the width direction of the tape material T. Therefore, the width of the tape material T becomes equal to the distance between the wall surfaces. In this case, assuming that intervals of fibers included in the tape material T do not change, the thickness of the tape material T becomes thick to an extent the width of the tape material T became small since the area of the cross section of the tape material T does not change. That is, the width and thickness of the tape material T change while keeping the cross-sectional area of the tape material T constant.

Therefore, when the tape material T is led to the outside of the path 13 in the middle of the path 13, which gradually decreases its width, the width of the tape material T becomes an interval between the wall surfaces at a position at which the tape material T departs from the path 13 and the wall surfaces. Accordingly, the width of the tape material T can be adjusted by adjusting a position where the tape material T departs from the path 13.

The interval between the wall surfaces which form the path 13 may be decreased continuously, or may be decreased intermittently. In other words, the width of the path 13 may be made constant partially, and at least a part of the width may be decreased continuously. When the interval between the wall surfaces which forms the path 13 is decreased intermittently, it is appropriate to prevent the occurrence of the level differences inside the path 13 from a viewpoint of feeding the tape material T smoothly. Accordingly, when the interval between the wall surfaces which form the path 13 is decreased intermittently, it is appropriate to form the path 13 by connecting two paths, having different constant widths, to each other through a path of which width decreases continuously, or by connecting two paths, of which widths decrease continuously, to each other though a path having a constant width, for example. Hereinafter, an example of case where the width of the path 13 for tape material T decreases continuously will be described.

What is necessary to allow the tape material T to depart from the path 13 in the middle of the path 13 is to make the bottom of the path 13 convex. Specifically, when the path 13 for tape material T having a convex bottom is formed in the width adjuster 4, the width of the tape material T which has passed through the path 13 can be changed by adjusting a position at which the tape material T, which has contacted with the bottom and the wall surfaces, departs from the wall surfaces and the bottom.

In the example shown in FIG. 1 and FIG. 2, a groove 13A having a convex curved bottom whose a normal direction changes continuously has been formed on a columnar member 14 as the path 13 for the tape material T. Then, the columnar member 14 having the groove 13A as the path 13 for the tape material T has been disposed between the compaction roller 10 and the fiber bundle support roller 11. Therefore, the tape material T of which tension has been generated by the compaction roller 10 and the fiber bundle support roller 11 can be inserted in the groove 13A of the columnar member 14. A shape of the member 14 may be a desired one as well as a columnar shape. Therefore, a shape of the member 14 may be platy, or a block shape of which cross section is rectangular.

Figure 3:
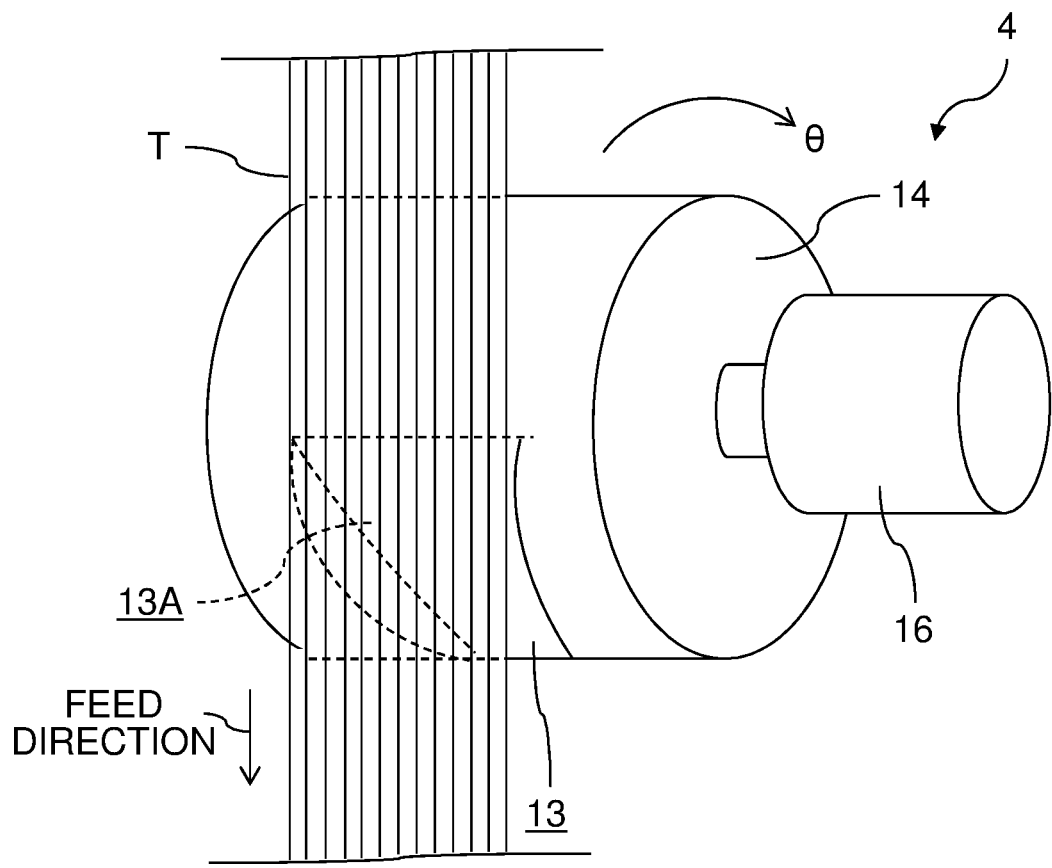
Figure 4:
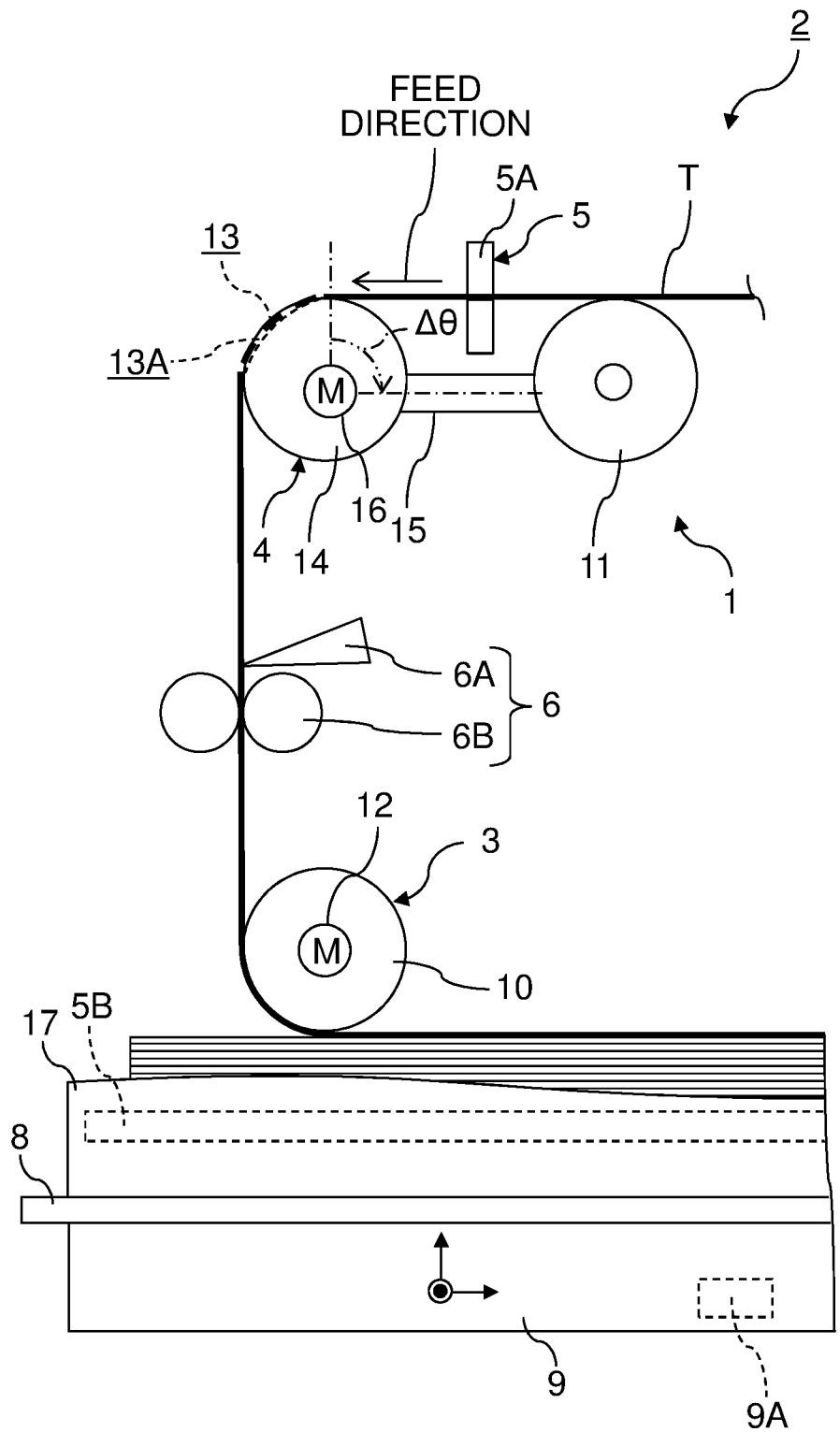
FIG. 4 explains a method of adjusting the width of the tape material T by rotating the path of the width adjuster shown in FIG. 1 relatively to the tape material.
Figure 5:
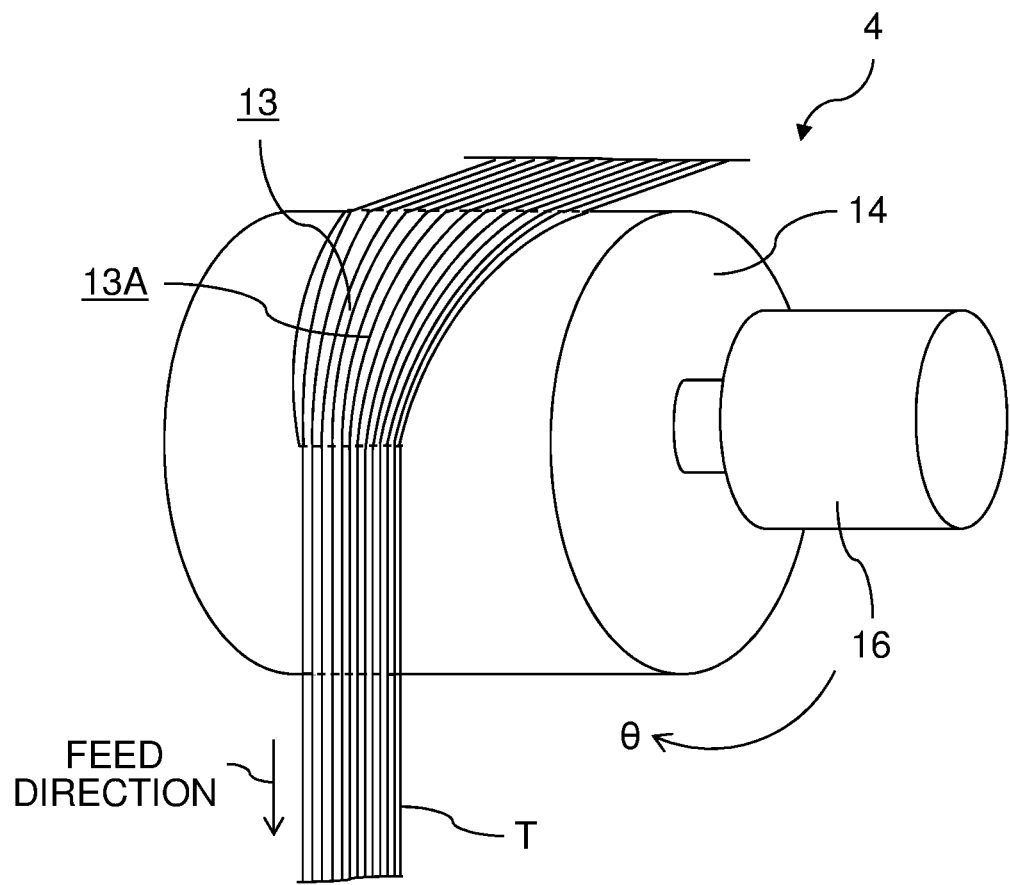

FIG. 3 is an enlarged perspective view of the width adjuster 4 shown in FIG. 1. FIG. 4 explains a method of adjusting the width of the tape material T by rotating the path 13 of the width adjuster 4 shown in FIG. 1 relatively to the tape material T. FIG. 5 is an enlarged perspective view of the width adjuster 4 shown in FIG. 4. Note that, illustration of the control device 7 has been omitted in FIG. 4.

As shown in FIG. 3, the width of the entrance of the path 13 for the tape material T formed as the groove 13A is determined to be not less than the width of the tape material T which has not been adjusted. Therefore, when there are varieties of widths of the tape materials T which have not been adjusted, the width of the entrance of the path 13 is determined to be not less than the maximum width of the tape material T.

Therefore, when the path 13 is disposed so that the tape material T may pass through only near the entrance of the path 13 as shown in FIG. 3, the tape material T departs from the path 13 while the width of the tape material T does not change or only becomes slightly narrow even when the width of the tape material T changes.

On the contrary, a position where the tape material T departs from the path 13 can be changed by rotating the path 13 for the tape material T, relative to the tape material T, around an axis perpendicular to each of the length direction and the thickness direction of the tape material T as exemplified in FIG. 4 and FIG. 5. That is, a position where the tape material T detaches from the bottom and the wall surfaces of the path 13 to leave the path 13 can be adjusted by adjusting the rotation angle θ of the path 13 for the tape material T. Therefore, the width of the tape material T which passed through the path 13 can be adjusted by adjusting the rotation angle θ of the path 13 for the tape material T.

It is important to make the tape material T enter the path 13 consisting of the groove 13A at a position where the width of the path 13 is not less than the unadjusted width of the tape material T even when the rotation angle θ of the path 13 is changed by rotating the member 14 in which the path 13 has been formed, from a viewpoint of preventing bending of the tape material T in the thickness direction of the tape material T and the reduction in uniformity of the tape material T. For that purpose, it is appropriate not to change a position at which the tape material T enters the path 13 even when the rotation angle θ of the path 13 is changed. That is, changing only a position where the tape material T leaves the path 13 without changing a position where the tape material T enters the path 13 makes it possible to variably adjust the width of the tape material T without deteriorating the quality of the tape material T.

Thus, when the rotation angle θ of the path 13 and the member 14 having the path 13 is changed by the angle Δθ, it is appropriate to move the fiber bundle support roller 11 so that a position, at which the tape material T enters the path 13, and a feeding direction of the tape material T toward the position, at which the tape material T enters the path 13, may be also changed by the angle Δθ. As a concrete example, the fiber bundle support roller 11 can be rotationally moved along a circular arc track by coupling the member 14, having the path 13, to the fiber bundle support roller 11 with a coupling shaft 15. In this case, a rotating shaft of the member 14 can be directly or indirectly coupled to an output shaft of a motor 16, for example. Thereby, the fiber bundle support roller 11 can be rotationally moved by a desired angle Δθ together with the member 14, having the path 13, by driving the motor 16.

Alternatively, a link mechanism for rotationally moving the fiber bundle support roller 11 along a circular arc track may be formed by coupling the rotating shaft of the fiber bundle support roller 11 rotatably to one end of a linear expansion and contraction structure and/or a linear moving structure, such as a cylinder structure, a ball screw or a rack and pinion, while coupling the other end of the linear expansion and contraction structure and/or the linear moving structure rotatably to another link.

As another example, the fiber bundle support roller 11 may not be turned but be moved in parallel in a direction perpendicular to the rotating axis of the fiber bundle support roller 11 so that a position at which the tape material T enters the path 13 may not be changed even when the rotation angle θ of the path 13 is changed. In that case, what is necessary is to support the fiber bundle support roller 11 and the member 14, having the path 13, with separate supporting members so that the distance between the fiber bundle support roller 11 and the member 14 having the path 13 can be changed.

Thus, a moving direction and a moving structure of the fiber bundle support roller 11 are flexible as long as a feeding direction of the tape material T toward a position at which the material T enters the path 13 can be changed so that the position at which the material T enters the path 13 may not be changed while the tension of the tape material T is maintained. Conversely, as long as the fiber bundle support roller 11 is automatically moved in an appropriate direction by an appropriate distance with a powered moving structure, in conjunction with rotation of the path 13, a feeding direction of the tape material T toward a position at which the tape material T enters the path 13 can be changed so that the position at which the tape material T enters the path 13 may not be changed while the tension of the tape material T is maintained even when the rotation angle θ of the path 13 is changed.

Note that, when the width adjustment device 1 is a device manually handled by an operator, a lever or the like for handling may be prepared so that an operator can manually rotate the member 14 having the path 13 and move the fiber bundle support roller 11, similarly to the rotation of the compaction roller 10. Therefore, the width adjuster 4 can be composed of at least a rigid body, such as the member 14, having the path 13 for the tape material T, and may have the motor 16 for moving the rigid body, as needed.

Moreover, a part of the path 13 through which the tape material T certainly passes may not be the groove 13A, but may be a through hole. Specifically, the groove 13A may be covered so that the top surface may be formed in the path 13, except for a range which can be a position where the tape material T enters the path 13 and a range which can be a position where the tape material T separates from the path 13. In that case, the tape material T can be prevented from separating from the path 13 at an unintended position.

When the tape material T is a prepreg, it is preferable to sufficiently reduce the viscosity of a resin with which a fiber bundle is impregnated so that the tape material T can be deformed easily, from a viewpoint of maintaining the uniformity of the tape material T after changing the width of the tape material T. In order to easily deform a prepreg, it is effective to raise the temperature of a resin though it also depends on composition of the resin and a deformation amount of the prepreg.

Meanwhile, also in a case where the tape material T is a dry tape material to which thermoplastic binder has been attached, shaping the dry tape materials in a state where the thermoplastic binder has been melted, and subsequent curing the thermoplastic binder makes it possible to keep a shape of a dry preform after the shaping.

Accordingly, at least one heater 5 can be disposed for heating at least one of the tape material T which has not entered the path 13 of the width adjuster and the tape material T which has come out from the path 13, as necessary. Each heater 5 can have a configuration for heating the tape material T by any of heat conduction, heat transfer and radiation. In other words, at least one heater 5 having a desired configuration, such as an electric type, a fluid circulation type or a hot air type, can be disposed.

In the illustrated example, the first heater 5A, for heating the tape material T before the width is changed by the width adjuster 4, and the second heater 5B, for heating the tape material T after the width is changed by the width adjuster 4, have been disposed.

For example, the first heater 5A can have a guide function which holds the tape material T from both sides as illustrated. As another example, the first heater 5A may be built in the fiber bundle support roller 11 so that the tape material T consisting of a prepreg before the width is changed can be heated by the fiber bundle support roller 11.

When the tape material T consisting of a prepreg before the width is changed is heated with the first heater 5A, the tape material T can be easily deformed. As a result, the width of the tape material T can be changed without deteriorating the quality, such as the uniformity, of fibers as much as possible.

Meanwhile, the second heater 5B can be built in a mold 17, such as a shaping mold or a forming mold, for laminating and shaping the tape materials T as illustrated so that a laminated body of the tape materials T after changing the width can be heated, for example. As a matter of course, a heater with a guide function which holds the tape material T from both sides may be prepared as the second heater 5B. Alternatively, at least one terminal which heats the laminated tape materials T from the surface side in spot may be prepared as the second heater 5B.

When the tape material T after changing the width, in particular, a laminated body of the tape materials T laminated on the mold 17, is heated by the second heater 5B, it becomes easy to shape a preform and keep a shape of the preform after the shaping. That is, when the tape material T is a prepreg, the tape materials T can be laminated in a state that the tape materials T have fit to the mold 17 as much as possible since the tape materials T can be easily deformed.

Meanwhile, when the tape material T is a dry tape material including thermoplastic binder, a shape of dry preform can be kept by melting the thermoplastic binder included in a laminated body of the dry tape materials and curing the thermoplastic binder after shaping the dry preform. Moreover, when at least one terminal for heating in spot is prepared, the dry tape material after adjudging the width can be laminated while the dry tape material is temporarily fixed with the thermoplastic binder.

When the continuous or intermittent lamination of the tape materials T is completed, it is necessary to cut off the tape material T. Thus, the cutter 6 for the tape material T can be disposed in the outlet side of the width adjuster 4. The cutter 6 can be composed of a cutter blade 6A, for cutting off the tape material T which passed through the path 13 of the width adjuster 4, and a guide 6B for guiding an end part of the tape material T after cutting the tape material T by the cutter blade 6A, for example. The guide 6B can be composed of a pair of rollers, which hold the tape material T from both sides, pressing members, or the like.

The table 8 is a pedestal for placing the mold 17, such as a lamination mold, a shaping mold, or a forming mold, used for laminating the tape materials T, such as prepregs or dry tape materials. Alternatively, the table 8 may be provided with a function as the mold 17 so that the tape materials T can be laminated directly on the table 8. In other words, the table 8 may be integrated with the model 17. Then, a laminated body of fibers can be produced by laminating the tape materials T, of which widths have been adjusted by the width adjuster 4, on the mold 17 on the table 8.

When the mold 17 is a laminating mold and a laminated body of fibers is shaped with another shaping mold, the fibers laminated on the mold 17 are transferred onto the shaping mold. On the contrary, when the mold 17 is a shaping mold, the tape materials T are laminated and shaped with the mold 17 with the necessary heating and pressurization. After that, the shaped preform is transformed onto a forming mold. Meanwhile, when the mold 17 is a forming mold for a composite material, a composite material is molded by thermally curing resin included in a laminated body of fibers placed on the mold 17. Therefore, when the tape material T is a dry tape material, the resin is injected by vacuuming. After that, in order to thermally cure the resin, the necessary pressurization is performed by pressing with an upper mold or vacuuming, in addition to heating.

Therefore, when the mold 17 is a shaping mold or a forming mold, the entirety of the mold 17 on which a laminated body of fibers has been placed may be carried into a heating device, such as an oven or an autoclave apparatus.

The moving structure 9 changes a relative position of the table 8 to the tape material T which passed through the path 13. Although the moving structure 9 moves the table 8 in three axis directions orthogonal to each other in an illustrated example, a supplying position of the tape material T having an adjusted width may be moved to the table 8. That is, the whole feeding structure of the tape material T including the compaction roller 10 may be moved to the table 8 in an illustrated example. As a matter of course, the moving structure 9 may move both the table 8 and a supplying position of the tape material T, having an adjusted width, and rotate at least one of them around a desired axis.

The moving structure 9 can be composed of desired known mechanism including a rack and pinion which is a pair of gears, cylinder mechanism having a piston, a ball screw, traveling mechanism having wheels traveling on rails or a track, and a crawler, such as a chain rotating by rotation of a sprocket or a belt moving with rollers.

Also by relatively moving the table 8 by the moving structure 9, the tape material T can be fed out due to the tension of the tape material T after the lamination and the frictional forces of the tape material T with the compaction roller 10 and another tape material T adjacent in the thickness direction of a laminated body of the tape materials T. Accordingly, the compaction roller 10 may not be rotated by a power source, such as the motor 12 or the like, but be passively rotated by relative movement of the table 8 and the frictional force with the tape material T.

The control device 7 integrally controls the automatic lamination apparatus 2 having the width adjustment device 1. Specifically, the control device 7 has a function to control respective components including the feeder 3, the width adjuster 4, the heater 5, the cutter 6, and the moving structure 9 by outputting control signals to the respective components so that the respective components automatically operate or semi-automatically operate partially with necessary manual operation. Each control signal may be not only an electric signal, but a hydraulic signal or a pneumatic signal. Therefore, the control device 7 can be composed of signal processing circuitry which generates and outputs control signals, such as electric signals, hydraulic signals, or pneumatic signals.

The control device 7 can have an input device 7A, for inputting necessary information to control the automatic lamination apparatus 2 having the width adjustment device 1, and a display 7B for displaying necessary information to control the automatic lamination apparatus 2 having the width adjustment device 1.

As a concrete example, the width of the tape material T to be produced can be directed to the control device 7 by operation of the input device 7A. For that purpose, reference information, such as a table or a function, showing relationship between widths of the tape material T to be produced and rotation angles $\theta$ of the path 13 for the tape material T can be stored in a storage 7C included in the control device 7. That is, information for transforming the width of the tape material T, separating from the path 13 of the width adjuster 4, to the rotation angle $\theta$ of the path 13 can be stored as reference information in the storage 7C. The reference information can be previously obtained by geometric calculation, calculation by simulation, or examination.

Then, when direction information on the width of the tape material T to be produced is input from the input device 7A to an operation unit 7D of the control device 7, the operation unit 7D can obtain a control value of the rotation angle $\theta$ of the path 13 by referring to the reference information stored in the storage 7C. Then, the operation unit 7D can generate a control signal to make the rotation angle $\theta$ of the path 13 become the control value, and output the generated control signal to the device, such as the motor 16, for changing the rotation angle $\theta$ of the path 13

The width of the tape material T to be produced is not always constant but can also be changed. When the rotation angle $\theta$ of the path 13 is changed while the tape material T is fed out by the feeder 3, it becomes possible to produce the tape material T whose width is not constant, i.e., the tape material T having different widths at positions of cross sections. When the tape material T whose width is not constant is produced, the control device 7 has only to perform integral control for interlocking feeding the tape material T by the feeder 3 with rotating the path 13 relatively to the tape material T.

More specifically, the operation unit 7D of the control device 7 can input direction information on a width change amount or a width change rate per unit length of the tape material T, from the input device 7A, and calculate a feeding speed of the tape material T and an angular velocity of the rotation angle $\theta$ of the path 13 so that the width of the tape material T changes by the directed width change amount or at the width directed change rate. Then, the operation unit 7D can synchronously-control the driving device, such as the motor 12, for operating the feeder 3, and the driving device, such as the motor 16, for changing the rotation angle θ of the path 13 formed in the width adjuster 4 so that the rotation angle θ of the path 13 changes at the calculated angular velocity while the tape material T is fed out at the calculated speed. Thereby, the radial tape material T of which width decreases or increases gradually, the tape material T having a partially narrow width, or the like can be produced.

Similarly, the control device 7 can also synchronously-control the moving structure 9 of the table 8 so that the table 8 may relatively move at an appropriate speed corresponding to the feeding speed of the tape material T. Specifically, control signals generated in the operation unit 7D of the control device 7 can be output to a control device 9A of the moving structure 9 so that the table 8 may move while interlocking with operation of the feeder 3.

When the compaction roller 10 composing the feeder 3 is freely rotated as mentioned above, the relative speed of the table 8 is equal to the feeding speed of the tape material T. Therefore, the control device 9A of the moving structure 9 is the object to be controlled to determine the feeding speed of the tape material T, instead of the driving device, such as the motor 12, for operating the feeder 3.

When the tape material T, of which width changes slightly, or the tape material T having a complicated shape is produced, control program for synchronously-controlling the feeder 3, the width adjuster 4 and the moving structure 9 may be previously generated and stored in the storage 7C of the control device 7 so that the whole automatic lamination apparatus 2 including the width adjustment device 1 can be automatically operated by the control program. Conversely, when the tape material T having a simple shape with a constant width is produced, the width adjuster 4 may also be a structure which is not automatically controlled but manually adjusted since the rotation angle θ of the path 13 is fixed during the feeding of the tape material T.

(Fiber Width Adjustment Method and Composite Material Molding Method)

Next, a method of producing the tape material T, having adjusted width, using the width adjustment device 1 and a method of molding a composite material using the tape material T, having adjusted width, as a material.

Figure 6:
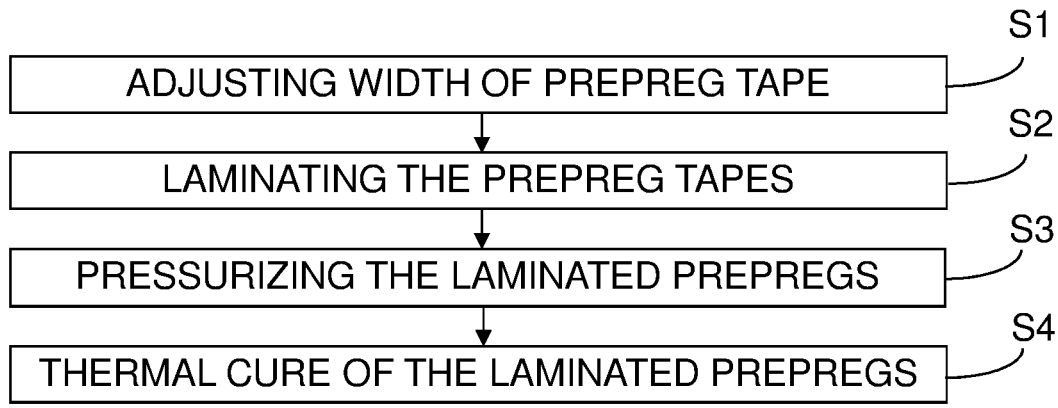
FIG. 6 is a flow chart showing a flow in a case where a composite material is molded by laminating prepreg sheets as the tape materials shown in FIG. 1.

FIG. 6 is a flow chart showing a flow in a case where a composite material is molded by laminating prepreg sheets as the tape materials T shown in FIG. 1.

At first, in step S1, the width of the tape material T consisting of a prepreg tape is adjusted by the width adjustment device 1. When a user inputs information, directing the width of the tape material T, into the operation unit 7D of the control device 7 by operating the input device 7A, for example, the operation unit 7D obtains a control value of the rotation angle θ of the path 13 for the tape material T, formed so that the width gradually decreases on the member 14 of the width adjuster 4, by referring to the reference information stored in the storage 7C. Specifically, an inclined angle of the path 13 relative to a feeding direction of the tape material T is obtained based on information showing the relation between adjusted widths of the tape material T and the rotation angles θ of the path 13 so that the tape material T may separate at a position of the path 13 where the width of the path 13 is approximately the same as the adjusted width of the tape material T.

The control value of the rotation angle θ of the path 13 is output as a control signal for rotating the member 14, from the operation unit 7D of the control device 7 to the motor 16. Then, the motor 16 drives so that the rotation angle θ of the path 13 for the tape material T formed on the member 14 becomes the targeted angle. That is, the member 14 having the path 13 for the tape material T is positioned so that the tape material T may separate at a position of the path 13 where the width is approximately the same as the adjusted width of the tape material T when the tape material T is fed into the path 13 for the tape material T formed on the member 14.

On the other hand, control signals are output from the operation unit 7D of the control device 7 to the motor 12, for rotating the compaction roller 10 included in the feeder 3, and the control device 9A of the moving structure 9, for moving the table 8 on which the mold 17 has been placed. Accordingly, the compaction roller 10 is rotated by rotary drive of the motor 12 while the table 8 moves in a feeding direction of the tape material T by drive of the moving structure 9 under the control by the control device 9A.

As a result, the tape material T supplied from a stock roller or the like is fed out in the length direction of the tape material T toward the path 13 of the width adjuster 4 while being guided with the fiber bundle support roller 11. When the tape material T enters the path 13 of the width adjuster 4, the tape material T separates at a position of the path 13 where the width is approximately the same as the width of the tape material T after adjustment since the rotation angle θ of the path 13 has been adjusted according to the width of the tape material T after the adjustment. Accordingly, the width of the tape material T which passed through the path 13 of the width adjuster 4 becomes the targeted width.

Therefore, the tape material T having a non-constant width can also be produced by rotating the path 13 of the width adjuster 4 relatively to the tape material T while feeding out the tape material T in the length direction of the tape material T. That is, the width of the tape material T which passed through the path 13 can be changed by adjusting a part, within which the tape material T passes through while contacting with the wall surfaces and the bottom, of the path 13 for the tape material T formed in the width adjuster 4.

When the tape material T entering the path 13 of the width adjuster 4 is heated by the first heater 5A, deformation of the tape material T for changing the width and thickness becomes easy since the fluidity of resin increases. The tape material T which passed through the path 13 of the width adjuster 4 reaches the compaction roller 10 and is fed out toward the mold 17 placed on the table 8.

Until the tip of the tape material T reaches the compaction roller 10, the guide 6B of the cutter 6 or the like, the tension of the tape material T may be insufficient. In that case, the tape material T may not pass through an intended part of the path 13, and the width of the tape material T may not be adjusted appropriately. Accordingly, the tip part of the tape material T of which width is not adjusted appropriately can be cut by the cutter blade 6A of the cutter 6. Alternatively, feeding of the tape material T may be started after the tape material T is set between the fiber bundle support roller 11 and the guide 6B of the cutter 6, the compaction roller 10 or another supporting part so that the tension of the tape material T is generated.

Next, in step S2, the tape materials T each having the width adjusted by the width adjustment device 1 of fibers, that is, prepreg tapes each having the predetermined width and thickness are laminated on the mold 17 placed on the table 8. Specifically, each prepreg tape is laid on the mold 17 since the mold 17 placed on the table 8 relatively moves to a feeding direction of each prepreg tape. When the mold 17 has concavity and convexity, or a curved surface, the table 8 may be moved in a thickness direction of a prepreg tape by the moving structure 9, as necessary, so that the prepreg tape can be pressed and laid on the mold 17 on the table 8 with a sufficient pressure by the compaction roller 10.

When the table 8 has moved and a prepreg tape has been laid to the edge of the mold 17, the prepreg tape is cut by the cutter blade 6A. After that, another prepreg tape is laid on the prepreg tape which has been laid on the mold 17. Repeating such lamination of a prepreg tape completes a laminated body of the prepregs. Since the resin included in the prepregs has adhesiveness and easily deforms, the prepregs can be often shaped into a shape of the mold 17 only by laminating the prepregs on the mold 17. As necessary, prepregs which are being laminated may be heated by the second heater 5B so that the prepregs can easily fit to the mold 17.

Next, in step S3, the laminated body of the prepregs is pressurized. Typical methods of pressurizing the laminated body of the prepregs include a method of pressing an upper mold and a method of applying the atmospheric pressure by bagging. In any case, the laminated body of the prepregs may be pressurized after being unloaded from the table 8 together with the mold 17. Moreover, the laminated body of the prepregs may be pressurized after being removed from the mold 17 and assembled with other parts.

Next, in step S4, the laminated body of the prepregs is thermally cured. Specifically, the laminated body of the prepregs is heated with a heater, such as an autoclave apparatus or an oven. When the laminated body of the prepregs has been heated, the resin is cured and an FRP composite material can be produced.

Figure 7:
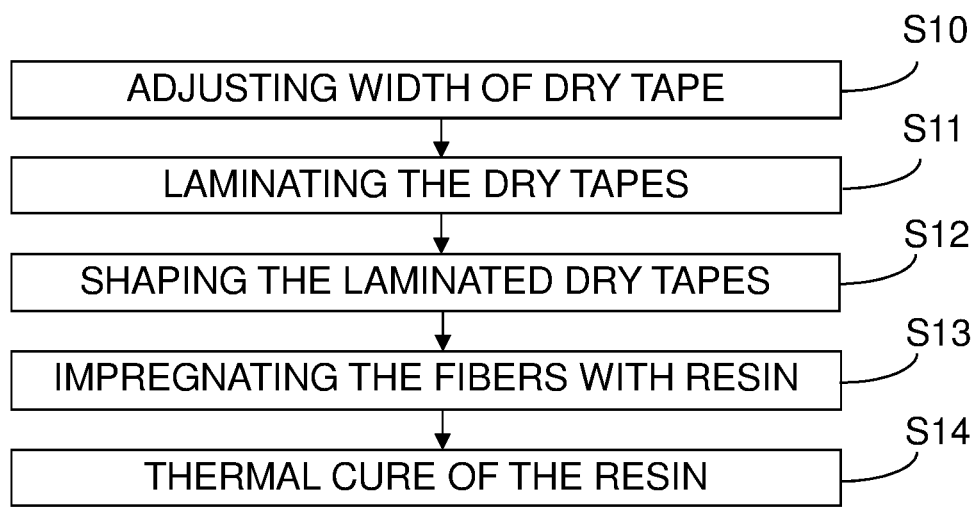
FIG. 7 is a flow chart showing a flow in a case where a composite material is molded by laminating dry tape materials as the tape materials shown in FIG. 1.

FIG. 7 is a flow chart showing a flow in a case where a composite material is molded by laminating dry tape materials as the tape materials T shown in FIG. 1.

At first, in step S10, the width of the tape material T consisting of a dry tape material is adjusted by the width adjustment device 1 in a flow similar to that in the case where the tape material T is a prepreg tape. Next, in step S11, the tape material T having the width adjusted by the fiber width adjustment device 1, that is, the dry tape material having the predetermined width and thickness is laminated on the mold 17 placed on the table 8. The lamination of the dry tape materials is also similar to the lamination of prepreg tapes.

Next, in step S12, the laminated body of the dry tape materials is shaped. Typical methods of shaping the dry tape materials include a method of giving a shape by pressing a mold and a method of applying the atmospheric pressure by bagging. The laminated body of the dry tape materials may be shaped using the mold 17, or may be shaped using other shaping molds.

When dry tape materials including binder, such as thermoplastic binder or thermosetting binder, are shaped, it is effective to laminate the dry tape materials while temporarily fixing the dry tape materials with the binder by heating each dry tape material in spot, or to melt or cure the binder by heating the whole laminated body of the dry tape materials during the shaping, in order to keep a shape of dry preform after the shaping. Thus, each dry tape material may be laminated and shaped while heating each dry tape material by one or both of the first heater 5A and the second heater 5B.

When the shaping of the laminated body of the dry tape materials has been completed, a dry preform can be obtained as the laminated body of the fibers having a shape corresponding to a shape of a composite material. The obtained dry preform may be transferred onto another mold, or the following process may be performed using the same shaping mold.

Next, in step S13, the fibers included in the dry preform are impregnated with resin. Specifically, when the dry preform has been bagged, liquid resin is injected into a space sealed by a bagging film. Meanwhile, when the dry preform has been placed in a space formed between molds, liquid resin is injected into the space between the molds with making the space between the molds be a vacuum state. Thereby, the fibers can be impregnated with the resin.

Next, in step S14, the resin with which the fibers included in the dry preform have been impregnated is thermally cured. That is, the resin is heated by a heater, similarly to thermal curing of a laminated body of prepregs. Thereby, the resin is cured and an FRP composite material can be produced.

Effects

The above-mentioned fiber width adjustment device 1, a method of adjusting the width of fibers and a method of molding a composite material are to prepare the path 13, which changes the width gradually, for the tape material T, and to change the width of the tape material T by adjusting a position where the tape material T separates from the path 13.

Therefore, according to the fiber width adjustment device 1, a method of adjusting the width of fibers and a method of molding a composite material, the width of the tape material T, such as a prepreg tape or a dry tape material, can be variably adjusted easily. In particular, the tape material T of which width changes continuously can be also produced. As a result, a degree of freedom for laminating fibers can be improved and the tape materials T can be laminated without clearance gaps so that a composite material, such as a curved composite material part having a curvature, having a complicated shape in which the width changes can be molded Second Implementation FIG. 8 is a front view showing structures of a fiber width adjustment device 1A according to the second implementation of the present invention and an automatic lamination apparatus 2 having the fiber width adjustment device 1A.

Figure 8:
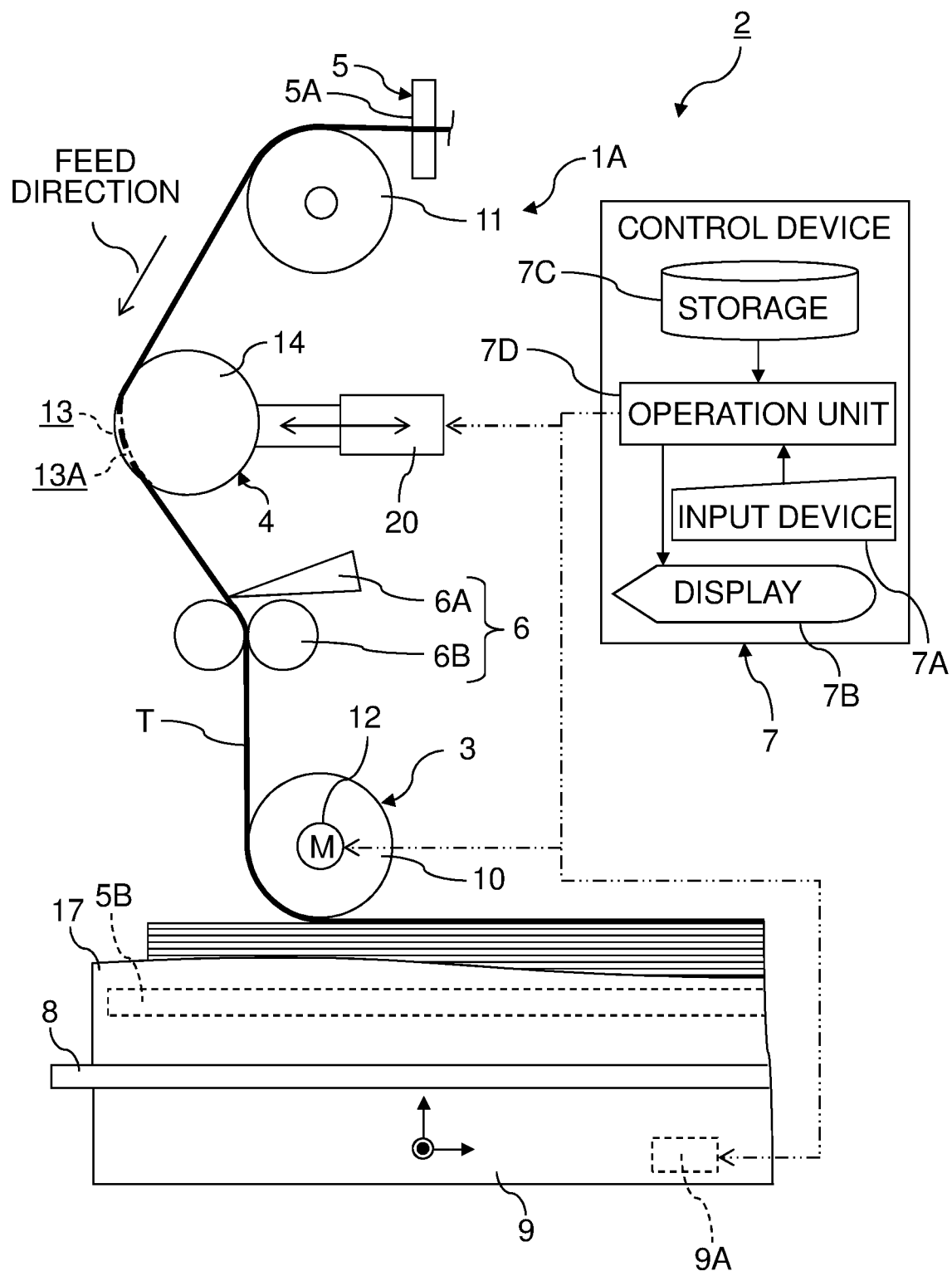
FIG. 8 is a front view showing structures of a fiber width adjustment device according to the second implementation of the present invention and an automatic lamination apparatus having the fiber width adjustment device.

The width adjustment device 1A in the second implementation shown in FIG. 8 is different from the width adjustment device 1 in the first implementation in a point that the member 14 having the path 13 for the tape material T is moved in parallel instead of being rotated. Since other structures and actions in the second implementation are not substantially different from those in the first implementation, explanation for the same or corresponding elements will be omitted with attaching the same signs.

As shown in FIG. 8, a position where the tape material T separates and secedes from the wall surfaces and the bottom of the path 13 can also be adjusted by relatively moving the path 13 of the width adjuster 4 in parallel in the thickness direction of the tape material T by a moving structure 20. Specifically, when the member 14 having the path 13 is moved in parallel in a direction in which the bottom of the path 13 is pressed to the tape material T, the length along which the tape material T contacts with the bottom of the path 13 becomes long. Therefore, the width of the path 13 at a position where the tape material T separates from the path 13 becomes narrow. Conversely, when the member 14 having the path 13 is moved in parallel in a direction in which the bottom of the path 13 is drawn apart from the tape material T, the length along which the tape material T contacts with the bottom of the path 13 becomes short. Therefore, the width of the path 13 at a position where the tape material T separates from the path 13 becomes large.

Accordingly, the width of the tape material T can be adjusted by adjusting a parallel moving amount of the member 14 having the path 13. Examples of the moving structure 20 for moving the member 14 having the path 13 in parallel include a traveling device having wheels for traveling on at least one rail or a track, a crawler, such as a chain rotating by rotation of sprockets or a belt moving by rollers, a rack and pinion, cylinder mechanism and a ball screw.

Note that, the member 14 having the path 13 may not be moved linearly in parallel, but also be moved so as to draw a curved locus. As a concrete example, the member 14 having the path 13 may be fixed at the tip of a pendulum so that the member 14 having the path 13 can be moved along an orbital on an arc in a direction in which the bottom of the path 13 is pressed on the tape material T and a direction in which the bottom of the path 13 is separated from the tape material T. In that case, the moving structure 20 can also be composed of a motor and a shaft rotated by the motor.

A parallel moving amount and a change amount in a rotation angle of the moving structure 20 can be automatically controlled by the control device 7. Specifically, a control signal or control signals directing a control amount of the moving structure 20 are output from the control device 7 to the moving structure 20 so that a position where the tape material T separates from the path 13 may becomes a targeted position. On the contrary, an operator may operate the moving structure 20 manually.

According to the above-mentioned second implementation, the configuration of the moving structure 20 for moving the member 14 having the path 13 for the tape material T can be simplified. In addition, movement of the fiber bundle support roller 11 can be made unnecessary.

Note that, both rotation movement and parallel translation of the member 14 having the path 13 for tape material T may be performed so that the width of the tape material T can be adjusted more finely. That is, the first implementation may be combined with the second implementation.

Third Implementation

Figure 9:
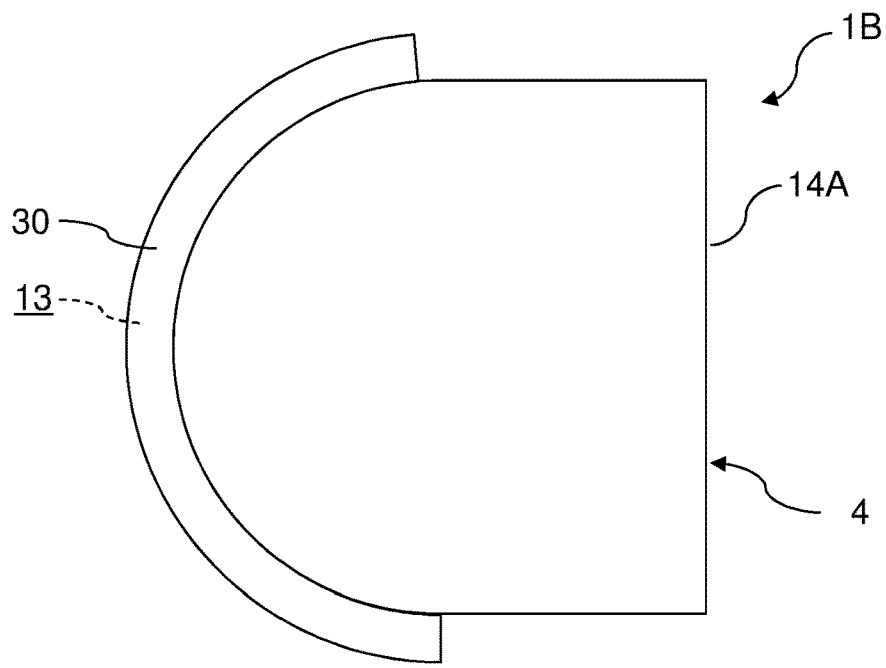
FIG. 9 is an enlarged front view showing a structure of a member included in a fiber width adjustment device according to the third implementation of the present invention.
Figure 10:
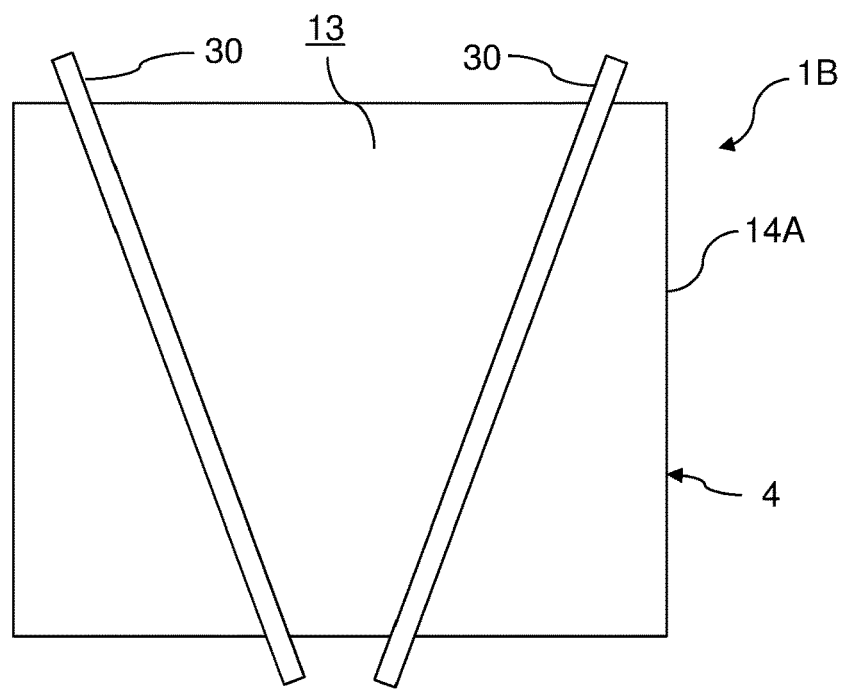
FIG. 10 is a left side view of the member shown in FIG. 9.

FIG. 9 is an enlarged front view showing a structure of a member 14A included in a fiber width adjustment device 1B according to the third implementation of the present invention. FIG. 10 is a left side view of the member 14A shown in FIG. 9.

The width adjustment device 1B in the third implementation shown in FIG. 9 and FIG. 10 is different from each of the width adjustment device 1 in the first implementation and the width adjustment device 1A in the second implementation in a structure of the member 14A having the path 13 for the tape material T. Since other structures and actions in the third implementation are not substantially different from those in each of the first and second implementations, only the structure of the member 14A having the path 13 for the tape material T is illustrated, and explanation for the same or corresponding elements will be omitted with attaching the same signs.

The path 13, of which width becomes narrow gradually, for the tape material T can also be formed by forming two flanges 30, of which interval becomes narrow continuously, on a convexly curved surface of the member 14A as exemplified by FIG. 9 and FIG. 10, instead of forming the groove 13A. As a practical example, the member 14A having the path 13 for the tape material T can be produced by forming the two flanges 30 on a curved convex surface of the member 14A having a cylindrical shape or a columnar shape as a whole or partially so that the length directions of the two flanges 30 may not be parallel to each other.

Note that, the upper surfaces of the flanges 30 may be coupled to each other with a plate member or the like so that the upper surface may be made to the path 13, within a range in which a position where the tape material T enters the path 13 and a position where the tape material T separates from the path 13 do not lie, similarly to a case of forming the groove 13A.

According to the above-mentioned third implementation, designing and producing the member 14A having the path 13 for the tape material T become easy since the structure of the member 14A is simplified.

Fourth Implementation

Figure 11:
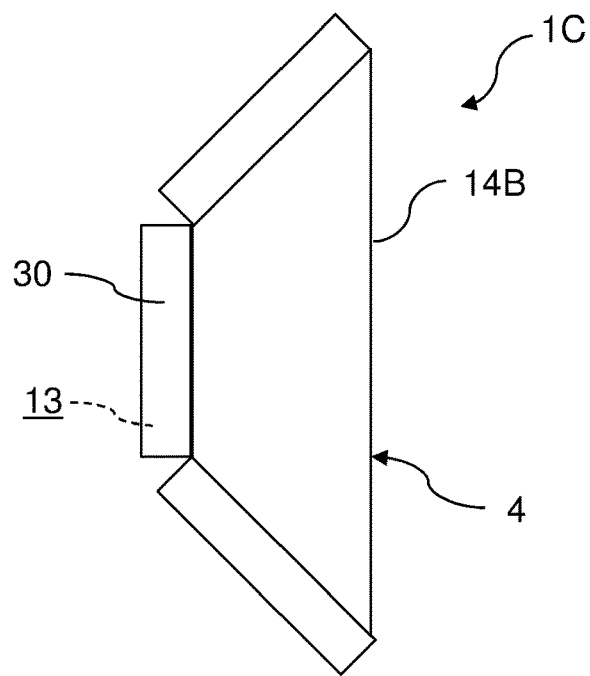
FIG. 11 is an enlarged front view showing a structure of a member included in a fiber width adjustment device according to the fourth implementation of the present invention.
Figure 12:
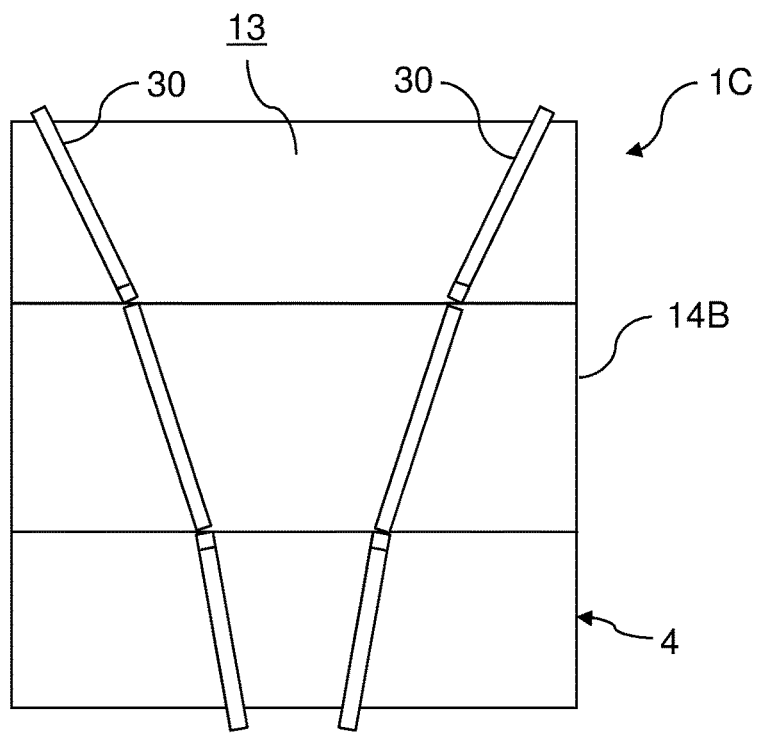
FIG. 12 is a left side view of a member shown in FIG. 11.

FIG. 11 is an enlarged front view showing a structure of a member 14B included in a fiber width adjustment device 1C according to the fourth implementation of the present invention. FIG. 12 is a left side view of the member 14B shown in FIG. 11.

The width adjustment device 1C in the fourth implementation shown in FIG. 11 and FIG. 12 is different from each of the width adjustment devices 1, 1A and 1B in the other implementations in a structure of the member 14B having the path 13 for the tape material T. Since other structures and actions in the fourth implementation are not substantially different from those in each of the other implementations, only the structure of the member 14B having the path 13 for the tape material T is illustrated, and explanation for the same or corresponding elements will be omitted with attaching the same signs.

The path 13, of which width becomes gradually narrow, for the tape material T may be formed on the member 14B as the path 13 having a bottom formed by connecting flat surfaces of which normal directions are different from each other as exemplified by FIG. 11 and FIG. 12. The path 13 may be formed as the groove 13A like the first implementation and the second implementation, or may be formed as a space between the two flanges 30 like the third implementation. In an example shown in FIG. 11 and FIG. 12, the path 13 for the tape material T has been formed as a space between the two flanges 30.

When the bottom of the path 13 is not a convex curved surface but a surface formed by flat surfaces connected with each other so as to be a convex shape, each of a position where the tape material T enters the path 13 and a position where the tape material T separates from the path 13 lies on a boundary portion between adjacent flat surfaces. In other words, each of a direction in which the tape material T enters the path 13 and a direction in which the tape material T separates from the path 13 becomes parallel to one of the flat surfaces forming the bottom of the path 13.

Therefore, it is appropriate not to continuously control movement, such as rotational movement and parallel movement, of the member 14B forming the path 13, but to control the movement of the member 14B in stages. That is, it is appropriate to move the member 14 relatively to the tape material T so that each of the direction in which the tape material T enters the path 13 and the direction in which the tape material T separates from the path 13 becomes parallel to one of the flat surfaces forming the bottom of the path 13.

According to the above-mentioned fourth implementation, designing and producing the member 14A having the path 13 for the tape material T become still easier since the structure of the member 14A is simplified further.

OTHER IMPLEMENTATIONS

While certain implementations have been described, these implementations have been presented by way of example only, and are not intended to limit the scope of the invention. Indeed, the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

What is claimed is:

1. A fiber width adjustment device comprising:
    a feeder configured to feed a tape material in a length direction of the tape material, the feeder including at least one roller, the tape material including fibers for a fiber reinforced resin after or before the fibers are impregnated with a resin; and
    an adjuster having a path for the tape material, the path being formed by at least a bottom and a pair of wall surfaces, an interval of the wall surfaces decreasing gradually, a width of the tape material which passed the path being changed by adjusting a part of the path, the tape material passing through the part of the path while contacting with the bottom and the wall surfaces,
    wherein the adjuster changes the width of the tape material by adjusting a position at which the tape material, which has contacted with the bottom and the wall surfaces, departs from the bottom and the wall surfaces, the bottom having a convex surface, and
    wherein the adjuster adjusts the position, at which the tape material departs, by moving the path in a direction parallel to a thickness direction of the tape material, the path being moved relatively to the tape material.

2. The fiber width adjustment device according to claim 1, wherein the convex surface is a curved surface or connected flat surfaces of which normal directions are different from each other.

3. The fiber width adjustment device according to claim 2, wherein the adjuster adjusts the position, at which the tape material departs, by rotating the path around an axis perpendicular to each of the length direction and the thickness direction of the tape material, the path being rotated relatively to the tape material.

4. The fiber width adjustment device according to claim 1, wherein the adjuster adjusts the position, at which the tape material departs, by rotating the path around an axis perpendicular to each of the length direction and the thickness direction of the tape material, the path being rotated relatively to the tape material.

5. The fiber width adjustment device according to claim 1, wherein the adjuster comprises a columnar shape devoid of any curvature, and
    wherein, the width of the path at a position where the tape material departs from the path decreases as the tape material contacts with the bottom of the path.

6. The fiber width adjustment device according to claim 1, further comprising:
    a control device, having circuitry, that controls the feeder and the adjuster to interlock feeding the tape material with moving the path relatively to the tape material, the changed width of the produced tape material becoming non-constant by interlocking feeding the tape material with moving the path.

7. The fiber width adjustment device according to claim 1, further comprising:
    a heater that heats at least one of the tape material before entering the path and the tape material after exiting from the path.

8. The fiber width adjustment device according to claim 1, further comprising:
    a cutter that cuts off the tape material which has passed through the path; and
    a guide that guides an end part of the tape material cut off by the cutter.

9. The fiber width adjustment device according to claim 1, further comprising:
    a table for producing a laminated body of the fibers by laminating the tape material; and
    a moving structure, having at least one of a wheel, a gear, a piston, a ball screw and a crawler, that changes a position of the table relatively to a position of the tape material which has passed through the path.

10. A method of molding a composite material comprising:
    producing a laminated body of the fibers by laminating the tape material of which the width has been changed by the fiber width adjustment device according to claim 1; and
    producing the composite material by the final curing of the resin with which the laminated body of the fibers has been impregnated.

11. A method of changing the width of the fibers comprising:
    producing the tape material, having the changed width, using the fiber width adjustment device according to claim 1.

12. The method of changing the width of the fibers according to claim 11, wherein the tape material having the changed width which is non-constant is produced by moving the path relatively to the tape material while feeding the tape material in the length direction of the tape material.

13. The method of changing the width of the fibers according to claim 11, wherein the tape material has a thickness of not less than 20 µm and not more than 120 µm.

14. A method of molding a composite material comprising:
    producing a laminated body of the fibers by laminating the tape material of which the width has been changed by the method of changing the width of the fibers according to claim 11; and
    producing the composite material by thermal curing of the resin with which the laminated body of the fibers has been impregnated.

15. A method of molding a composite material comprising:
    producing a laminated body of the fibers by laminating the tape material of which the width has been changed by the fiber width adjustment device according to claim 1; and producing the composite material by thermal curing of the resin with which the laminated body of the fibers has been impregnated.

\* \* \* \* \*